(12) United States Patent
Hoover

(10) Patent No.: US 9,787,849 B2
(45) Date of Patent: Oct. 10, 2017

(54) PUBLIC SAFETY INFORMATION MANAGEMENT SYSTEM WITH WEB-ENABLED DEVICES

(71) Applicant: Sam Houston State University, Huntsville, TX (US)

(72) Inventor: Larry T. Hoover, Huntsville, TX (US)

(73) Assignee: Sam Houston State University, Huntsville, TX (US)

( * ) Notice: Subject to any disclaimer, the term of this patent is extended or adjusted under 35 U.S.C. 154(b) by 0 days.

(21) Appl. No.: 14/631,452

(22) Filed: Feb. 25, 2015

(65) Prior Publication Data

US 2015/0244872 A1    Aug. 27, 2015

Related U.S. Application Data

(60) Provisional application No. 61/944,311, filed on Feb. 25, 2014.

(51) Int. Cl.

| | |
|---|---|
| *H04M 11/00* | (2006.01) |
| *H04M 11/04* | (2006.01) |
| *H04M 3/51* | (2006.01) |
| *H04M 7/00* | (2006.01) |
| *H04M 3/42* | (2006.01) |
| *H04W 4/22* | (2009.01) |
| *H04L 29/08* | (2006.01) |

(52) U.S. Cl.
CPC .......... *H04M 11/04* (2013.01); *H04M 3/5116* (2013.01); *H04L 67/02* (2013.01); *H04M 3/42357* (2013.01); *H04M 7/006* (2013.01); *H04W 4/22* (2013.01)

(58) Field of Classification Search
CPC ... H04M 11/04; H04M 3/5116; H04M 3/5191
USPC .......................................................... 379/45
See application file for complete search history.

(56) References Cited

U.S. PATENT DOCUMENTS

| | | | |
|---|---|---|---|
| 7,817,982 B1* | 10/2010 | Chu et al. .................. | 455/404.1 |
| 8,635,294 B2* | 1/2014 | Cavalcante et al. .......... | 709/206 |
| 2004/0102178 A1* | 5/2004 | Williams .................. | 455/404.1 |
| 2008/0037461 A1* | 2/2008 | Biltz .................... | H04L 41/0816 370/328 |
| 2008/0175356 A1* | 7/2008 | Seidberg et al. ............... | 379/45 |
| 2008/0267360 A1* | 10/2008 | Spector .......................... | 379/45 |
| 2009/0284348 A1* | 11/2009 | Pfeffer ................. | G08B 25/006 340/7.3 |

(Continued)

OTHER PUBLICATIONS

Getis et al. "Geographic Information Science and Crime Analysis" (2002) URISA Journal, 2(2), 7-14.

(Continued)

*Primary Examiner* — Stella Woo
(74) *Attorney, Agent, or Firm* — Meyertons, Hood, Kivlin, Kowert & Goetzel, P.C.

(57) ABSTRACT

A method of managing responder agency resources includes receiving information relating to one or more events, occurrences, or locations. Responders from two or more different jurisdictions are dispatched to the events, occurrences, or locations. One or more of the responders is dispatched through a web-enabled user device over the internet. Some of the responders may be dispatched through a system of a responder agency of one jurisdiction. Other responders may be dispatched through a system of a responder agency of another jurisdiction.

22 Claims, 18 Drawing Sheets

(56) References Cited

U.S. PATENT DOCUMENTS

| | | | | |
|---|---|---|---|---|
| 2010/0281405 A1* | 11/2010 | Whattam | ............... | G06N 5/025 |
| | | | | 715/764 |
| 2012/0265867 A1* | 10/2012 | Boucher | .............. | H04M 3/5116 |
| | | | | 709/223 |
| 2014/0211927 A1* | 7/2014 | Clawson | ......................... | 379/45 |
| 2015/0063202 A1* | 3/2015 | Mazzarella | ........ | H04B 7/18504 |
| | | | | 370/316 |

OTHER PUBLICATIONS

Grooff et al. "Mapping an Opportunity Surface of Residential Burglary" (2001) Journal of Research in Crime and Delinquency, 38(3), 257-278.

Mulmat et al. "Targeting Auto Theft with a Regional Task Force and Mapping Technology." (1998) San Diego Association of Governments, retrieved Feb. 21, 2007 from http://www.ncjrs.gov/pdffiles1/nij/grants/185356.pdf.

Walsh et al. "Predicting Decade-Long Changes in Community Motor Vehicle Theft Rates: Impacts of Structure and Surroundings" (2007) Journal of Research in Crime and Delinquency, 44(1), 64-90.

* cited by examiner

FIG. 8

| | | | | | Select Additional Call-Types to Filter Out | | | | | | | | 250 |
|---|---|---|---|---|---|---|---|---|---|---|---|---|---|

Backups, Traffic,
Disregarded Calls & all Field
Gen. CFS are Auto. Filtered

| Select Agency(s) | Select Call Priority Type | Enter Date/Time Range | Select Shift | | REFRESH REPORT DATA |
|---|---|---|---|---|---|
| ☑PD ☑FD ☑EMS | ☑Prty-1 ☑Prty-2 ☑Prty-3 ☑Prty-4 | Begin: 3/9/11 12:00 AM Ending: 3/9/11 11:59 PM | Begin: End: | ○ Call-Taker Report ● Dispatcher Report Select Specific Call Taker and/or Dispatcher Sel. Call Tracker: Sel. Dispatcher: ● ○ |

Universal City Police Department
Dispatcher Dispatch-Time Report
Beginning Wed, 3/9/11 @ 12:00 AM Through Wed, 3/9/11 @ 11:59 PM Grand Total: 27 Calls Dispatched    Avg. Input Time for All Calls: 0:00:11    Avg. Que/Tot. Disp. Times: 0:00:45  0:00:55

| Call Taker: | Case # | Call Type | Prty | Call Received | Sent To Pending | Call Input Time | Dispatcher: | Dispatch Time | Queue Time | Tot. Disp. Time |
|---|---|---|---|---|---|---|---|---|---|---|
| Hickman, Stewart #465: | PD-1100003908 | 87 Possession – Drugs - Parapher | 2 | 3/9/11 0:12:55 | 12:12:55 AM | 0:00:00 | Hickman, Stewart #465: | 12:14:24 AM | 0:01:29 | 0:01:29 |
| Hickman, Stewart #465: | PD-1100003909 | 37 Suspicious - Person | 2 | 3/9/11 0:22:16 | 12:22:24 AM | 0:00:08 | | 12:22:45 AM | 0:00:21 | 0:00:29 |
| Hickman, Stewart #465: | PD-1100003910 | 45 Animal Complaint | 2 | 3/9/11 0:43:02 | 12:43:14 AM | 0:00:12 | | 12:44:00 AM | 0:00:46 | 0:00:58 |
| Hickman, Stewart #465: | PD-1100003912 | 77 Disabled Vehicle | 2 | 3/9/11 3:07:40 | 3:07:40 AM | 0:00:00 | | 3:08:03 AM | 0:00:23 | 0:00:23 |
| Hickman, Stewart #465: | PD-1100003914 | 17 Disturbance - Verbal | 2 | 3/9/11 3:27:34 | 3:27:52 AM | 0:00:18 | | 3:28:07 AM | 0:00:15 | 0:00:33 |
| Hickman, Stewart #465: | PD-1100003970 | 77 Disabled Vehicle | 2 | 3/9/11 19:23:57 | 7:24:06 PM | 0:00:09 | | 7:25:17 PM | 0:01:11 | 0:01:20 |
| Hickman, Stewart #465: | PD-1100003980 | 04 Disturbance – Juvenile In Need | 2 | 3/9/11 21:50:43 | 9:50:43 PM | 0:00:00 | | 9:52:26 PM | 0:01:43 | 0:01:43 |
| Hickman, Stewart #465: | PD-1100003984 | 90 Alarm - Business | 2 | 3/9/11 23:15:33 | 11:15:33 PM | 0:00:00 | | 11:16:31 PM | 0:00:58 | 0:00:58 |
| Hickman, Stewart #465: | PD-1100003985 | 49 Disturbance – Noise – Party - Do | 2 | 3/9/11 23:28:58 | 11:29:03 PM | 0:00:05 | | 11:29:54 PM | 0:00:51 | 0:00:56 |
| | | | | | | | Total Calls: 4 | | 0:00:53 | 0:00:59 |
| | | | | | | | Avg. Que. & Dispatch Times: | | | |
| Hollis, John #2584 | PD-1100003916 | 77 Disabled Vehicle | 2 | 3/9/11 7:37:02 | 7:37:14 AM | 0:00:12 | Hollis, John #465: | 7:37:25 AM | 0:00:11 | 0:00:23 |
| Hollis, John #2584 | PD-1100003923 | 01 Welfare Concern | 2 | 3/9/11 9:53:03 | 9:53:11 AM | 0:00:08 | | 9:54:07 AM | 0:00:56 | 0:01:04 |
| Hollis, John #2584 | PD-1100003925 | 77 Disabled Vehicle | 2 | 3/9/11 10:19:30 | 10:19:48 AM | 0:00:18 | | 10:20:11 AM | 0:00:23 | 0:00:41 |
| Hollis, John #2584 | PD-1100003935 | 62 Theft | 2 | 3/9/11 11:47:44 | 11:47:48 AM | 0:00:04 | | 11:48:18 AM | 0:00:30 | 0:00:34 |

Select Call-Type to Filter Out

REFRESH REPORT DATA

Universal City Police Department
Police Calls-For-Service Report By Call-Type

BEGINNING: 3/1/2013   THROUGH   3/31/2013

292

Total Primary: 2,229
Total Backups: 645

| CALL-TYPE | Primary | Backups |
|---|---|---|
| 001 911 Hangup | 13 | 12 |
| 01 Welfare Concern | 18 | 10 |
| 02 Juvenile - Missing | 4 | 0 |
| 02 Missing Person - Adult | 1 | 1 |
| 02 Missing Person - Juvenile | 3 | 0 |
| 03 Deliver Emergency Message | 1 | 0 |
| 04 Disturbance – Juvenile In Need | 19 | 7 |
| 10 Disturbance – Fight In Progress | 3 | 9 |
| 100 Special Assignment | 1 | 0 |

Universal City Police Department
Call Source Statistical Report
For Call-For Service Received Between
1/1/2012
12/31/2012

300

| Selected Call-Sources | | Num. | % |
|---|---|---|---|
| Actual 911 emergency call | ------ | 67 | 0.2% |
| Field generated call | ------ | 16363 | 54.4% |
| Non emergency 911 | ------ | 11 | 0.0% |
| Outside Agency Radio | ------ | 1 | 0.0% |
| Phone calls | ------ | 13573 | 45.2% |
| Teletype | ------ | 1 | 0.0% |
| Walk-in complainant | ------ | 44 | 0.1% |

FIG. 13

Alarm Permits — 360

Name of Business or Occupant
| | Date of Application |

Address of Alarm Site
Block: | Street: | Apt/Suite:
City: | State: TX | Zip Code: | Alarm Class:

Permit Holder (Person responsible for the Alarm System)
Last: | First: | MI: | Title: | DL#:
Street Address: | Hm Ph: | Wk Ph:
City: | State: TX | Zip Code: | Cel Ph/Other:

Primary Person to Respond to Alarm
Name: | Hm Ph: | Wk Ph: | Other:

Secondary Person to Respond to Alarm
Name: | Hm Ph: | Wk Ph: | Other:

Alarm Type: | Active: | Init. Fee: | Renewal Fee: | School/Govt. Bld:
Alarm Co.: | Business Phone:
Alarm Brand: | Previous Permit#: 0

Date Received: | Revocation Date: | Received By:
Date Issued: | Permit Number: 0 | Reinstated Date:

Payments
Payment Type | Payment Method | Amount Paid | Payment Date | Enter New Payment
 | | $0.00 | |

366

364

| Enter New Record | Find Permit# | Find Occupant | Find Location | Print Screen | Print List | Previous Menu |

Record: ◄ ◄ 1 of 1 ► ►► ►* ▽x No Filter  Search

FIG. 16

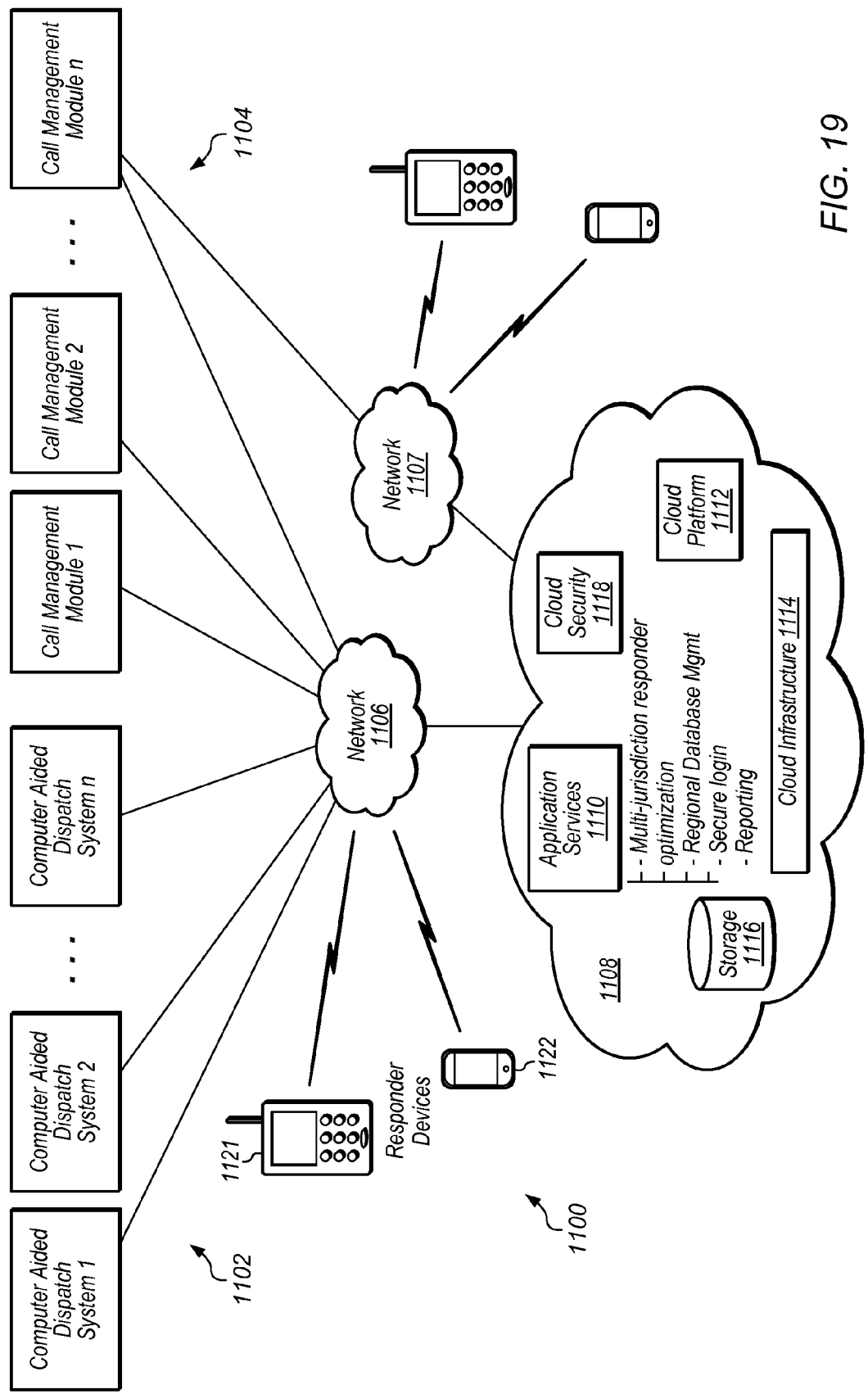

PUBLIC SAFETY INFORMATION MANAGEMENT SYSTEM WITH WEB-ENABLED DEVICES

PRIORITY CLAIM

This application claims priority to U.S. Provisional Application Ser. No. 61/944,311 entitled "PUBLIC SAFETY INFORMATION MANAGEMENT SYSTEM WITH WEB-ENABLED DEVICES" filed Feb. 25, 2014, which is incorporated herein by reference in its entirety.

BACKGROUND

Field

The present invention relates to the field of managing public services. More particularly, the present invention relates to the directing and assessing the activities of public safety agencies, such as police, fire, EMS, and disaster relief agencies.

Description of the Related Art

Public safety agencies, such as police, fire, and EMS, are responsible for responding to a multitude of different events, occurrences, and circumstances. Responding in an effective manner to the variety of situations and circumstances is a complex and resource-intensive undertaking. Computer-aided dispatch systems are used by many public agencies to help manage the resources available to the agencies. For some agencies, however, the cost and complexity of many existing dispatch systems may make them impractical or cost-prohibitive. This may be especially the case for agencies that are relatively small in size and/or have relatively limited financial resources.

In many situations, resources from multiple agencies (for example, fire, police, and EMS) from multiple jurisdictions (for example, two adjacent cities) are deployed to make an effective response. Challenges may arise in managing the personnel and other resources of different agencies and different jurisdictions, since each agency and each jurisdiction may have its own personnel, communication systems, protocols, rules, and procedures.

SUMMARY

Systems and methods for managing responder agency resources are described. In an embodiment, a method of managing responder agency resources includes receiving information relating to one or more events, occurrences, or locations. Responders from two or more different jurisdictions are dispatched to the events, occurrences, or locations. One or more of the responders is dispatched through a web-enabled user device over the internet. Some of the responders may be dispatched through a system of a responder agency of one jurisdiction. Other responders may be dispatched through a system of a responder agency of another jurisdiction.

In an embodiment, a system includes a processor and a memory coupled to the processor. The memory program instructions are executable by the processor to implement a method of managing responder agency resources includes receiving information relating to one or more events, occurrences, or locations. Responders from two or more different jurisdictions are dispatched to the events, occurrences, or locations. One or more of the responders is dispatched through a web-enabled user device over the internet.

In some embodiments, the system includes one or more call management modules. The call management modules may be connected to a regional system by way of a network, such as the internet. Each call management module may be used to log calls for service in lieu of a full computer assisted dispatch module. A call logging function, including full search and analysis components, is used to log activity. In certain embodiments, some jurisdictions and agencies on the regional system may have computer aided dispatch systems, while other jurisdictions and agencies have call management modules.

In an embodiment, a non-transitory, computer-readable storage medium includes program instructions stored thereon. The program instructions implement a method of managing responder agency resources includes receiving information relating to one or more events, occurrences, or locations. Responders from two or more different jurisdictions are dispatched to the events, occurrences, or locations. One or more of the responders is dispatched through a web-enabled user device over the internet.

In an embodiment, a method of managing responder agency resources includes receiving information relating to one or more events, occurrences, or locations. A computer system applies rules for allocating resources of the responder agencies. The rules include one or more rules to for optimization of responders of at two or more of the jurisdictions. Based on the applied rules, responders from two or more different jurisdictions are dispatched to the events, occurrences, or locations.

In an embodiment, responders from two or more different jurisdictions for events, occurrences, or locations are dispatched to events, occurrences, or locations. In response to user-provided criteria, one or more analytical reports are generated. The analytical reports are transmitted to users through a web-enabled user device.

In an embodiment, a method of managing alarm system resources includes monitoring, over a network, alarm activity relating to alarm systems in one or more jurisdictions. One or more violations relating to alarm activity are determined. One or more notices relating to the violations are transmitted to a web-enabled user device over the internet.

BRIEF DESCRIPTION OF THE DRAWINGS

FIG. 8 illustrates one embodiment of a dispatcher response log report.

FIG. 12 illustrates one embodiment of a calls-for-service by type report.

FIG. 13 illustrates one embodiment of a call source report.

FIG. 16 illustrates one embodiment of a search screen for alarm permits.

FIG. 19 illustrates one embodiment of a cloud computing system that can be implemented to provide information to participants in responder agencies.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As used herein, "responder agency" means an agency whose members or employees respond to incidents, accidents, events relating to public safety or well-being. Responder agencies may respond to criminal incidents, emergencies, natural disasters, or public gatherings. Examples of responder agencies include police, fire, emergency management, first responder, ambulance, and disaster relief agencies. As used herein, "events" includes emergency events, such as fires or crimes in progress, and non-emergency events, such as concerts or sporting events, parades, or public demonstrations.

In some embodiments, a system manages how multiple agencies use the system to cooperate with each other/coordinate responses and how agencies' different existing systems interact with one another. The system may provide tools for coordinating responses among agencies in different jurisdictions (for example, neighboring counties on the system). In some cases, the system includes applies rules and/or optimization to assist in dispatch and/or resource allocation.

In some embodiments, inter-jurisdictional system provides responder agencies pooled access to offense reports, booking records, pawnshop tickets, traffic citation and accident data, and gang and drug criminal intelligence records over a network. A regional system may serve any number of jurisdictions (for examples, counties or municipalities). Multiple dispatch centers may be linked to one another. The dispatch centers may handle all communications for police, fire, and EMS. Data from each agency's independent records systems may be replicated every 24 hours on a regional server.

Figure 1:
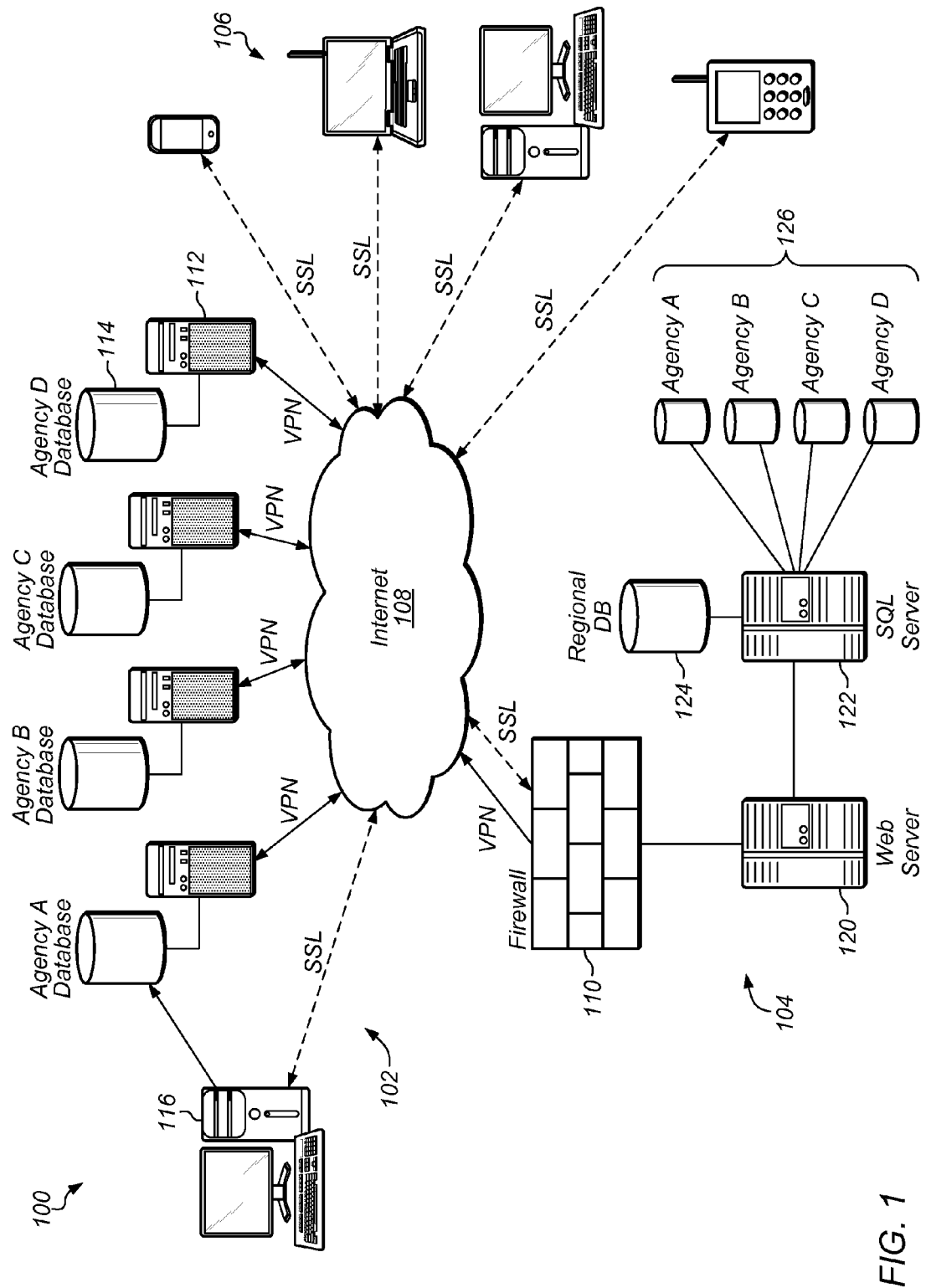
FIG. 1 illustrates one embodiment of system with dispatch systems for multiple agencies.

FIG. 1 illustrates one embodiment of system with dispatch systems for multiple agencies. System 100 includes agency systems 102, regional system 104, and field devices 106. Agency systems 102, regional system 104, and field devices 106 are connected to one another by way of internet 108. Regional system 104 is protected by firewall 110. Information specific to each of agencies A, B, C, and D may be accessed from dispatch station 116 by way of virtual private network connections. Dispatch station 116 and field devices 106 may access information on regional system 104 by way of secure connection (for example, secure socket layer).

Regional system 104 includes web server 120, SQL server 122, regional database 124, and agency databases 126. Participants, including responder personnel such as police officers, administrators, or other persons, may send and receive information to and from other devices in the system using field devices 106.

The system provides search and analysis capability. In some embodiments, a police department dispatches for fire and EMS as well. Participating agencies may participate in a regional mutual aid agreement. Contiguous agency unit status may be displayed in geospatial format, allowing for direct interagency dispatch of police back-ups, fire move-ups, and EMS dispatch.

A web-based information management system for police and other public service agencies integrates modules related to incidents (offense reports), computer-assisted dispatch, mobile communication interface, automated crime and incident reporting, arrests, bookings, property room management, jail management, traffic activity, crime analysis, and operational analysis. Modules may be linked to allow universal search, and data transfer. A central server may be used for all data storage and manipulation. A subscribing police agency may have on-site at their agency only a workstation with a browser linked to a central server by a high speed internet connection.

In some embodiments, a web-based system provides software as a service ("SaaS") to small departments. The departments may use the system without the necessity of visiting the agency. A web-based system may include a central server for all data storage and manipulation. Each subscribing agency (for example, police agency) may have on-site at its location a workstation with a browser linked to the server by a high speed internet connection.

In some embodiments, a system includes call management modules. Each call management module may be used to log calls for service in lieu of a full computer assisted dispatch module. In some embodiments, a mobile system is used to run stolen and wanted checks, and send e-messages. In some cases, for example, completion of offense reports from the patrol car is unnecessary—few offense reports are taken, and the drive to the police station to enter them is not far. The call management module may provide instantaneous server connectivity in a web-based environment. Call management modules may be used, for example, by smaller agencies, where it may be unnecessary to complete offense reports from the patrol car (for example, the geographic area is small enough that the police station is never far from an incident). In some embodiments, a call logging function, including full search and analysis components, is used to log patrol car activity, but a computer is not used to track the patrol cars.

Figure 2:
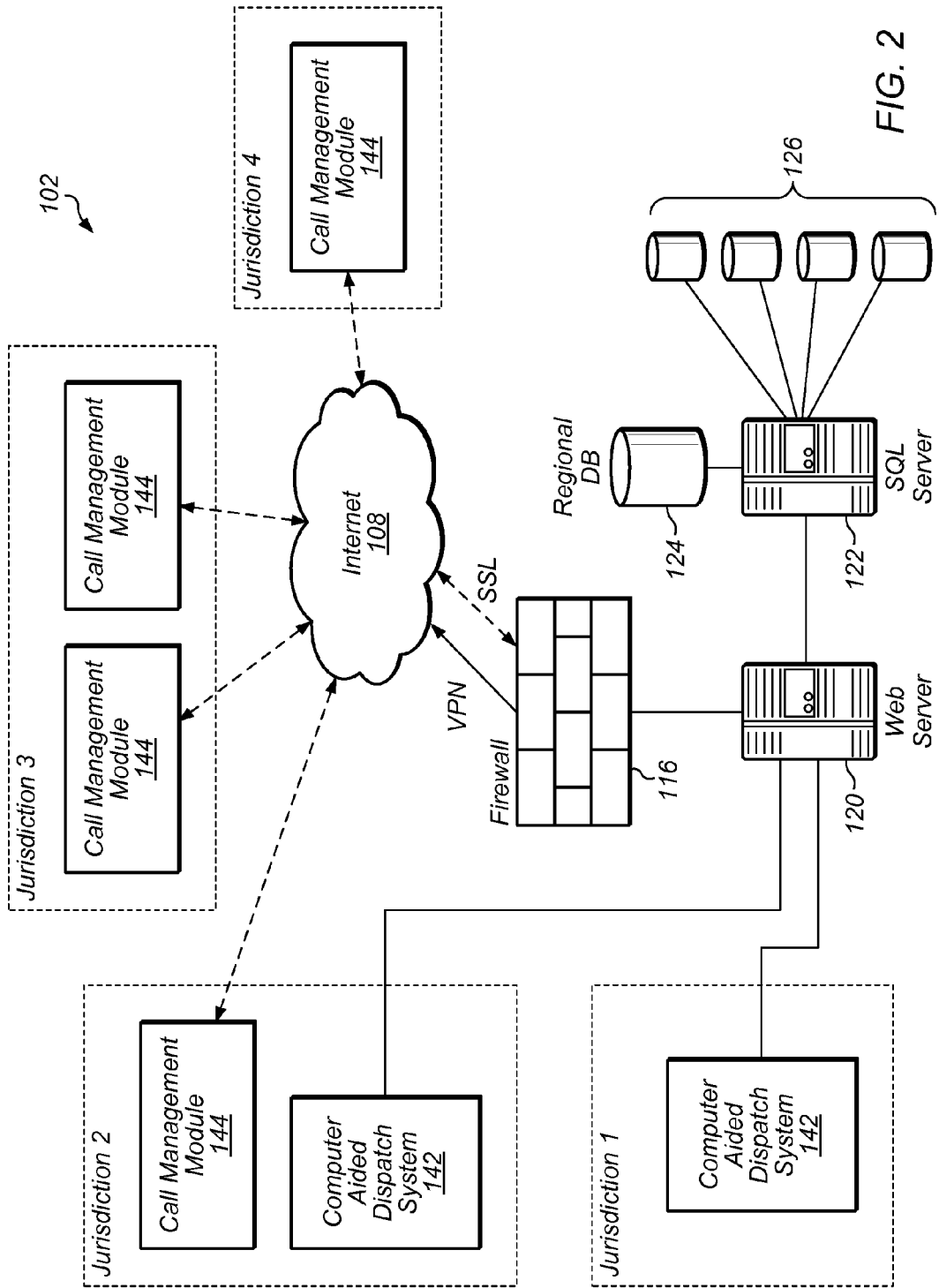
FIG. 2 illustrates one embodiment of a multi jurisdiction system with computer aided dispatch systems and call management modules.

FIG. 2 illustrates one embodiment of a multi jurisdiction system (for example, cover two or more adjacent counties) with computer aided dispatch systems and call management modules. System 140 includes computer-aided dispatch systems 142 and call management modules 144. Computer aided dispatch modules 142 can access information on regional system 146.

Computer-aided dispatch systems 142 and call management modules 144 are distributed across multiple jurisdictions 148. Each jurisdiction may be, for example, a different municipality, county, or other region or governmental unit. Management modules 144 are connected to regional system 146 by way of internet 108. In some embodiments, call management modules 144 have call logging functions, including full search and analysis components, but do not include all the functions of computer-aided dispatch systems 142.

Figure 3:
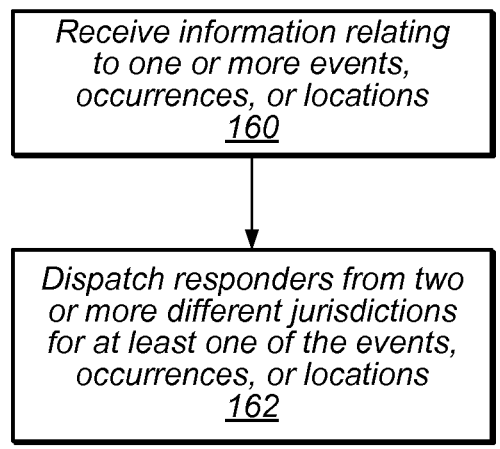
FIG. 3 illustrates one embodiment of a method of managing resources of responder agencies.

FIG. 3 illustrates one embodiment of a method of managing resources of responder agencies. At 160, a system receives information relating to one or more events, occurrences, or locations. An event may be, for example, a criminal incident, a fire, a medical emergency, or a public gathering.

At 162, responders from two or more different jurisdictions (for example, adjacent municipalities) are dispatched to the events, occurrences, or locations. At least some of the responders are dispatched through a web-enabled user device over the internet. One or more of the responders may be dispatched through a system of a responder agency of a first jurisdiction. One or more other responders may be dispatched through a system of a responder agency of a second jurisdiction.

In some embodiments, a call management module is implemented in a web-enabled user device. Calls may be logged with the call management module. In some embodiments, a call management module is used in lieu of a computer-aided dispatch system.

In some embodiments, one or more search queries are received. Responder systems from at least two of the jurisdictions may be searched. Results may be provided to users based on the results of the search queries.

Figure 4:
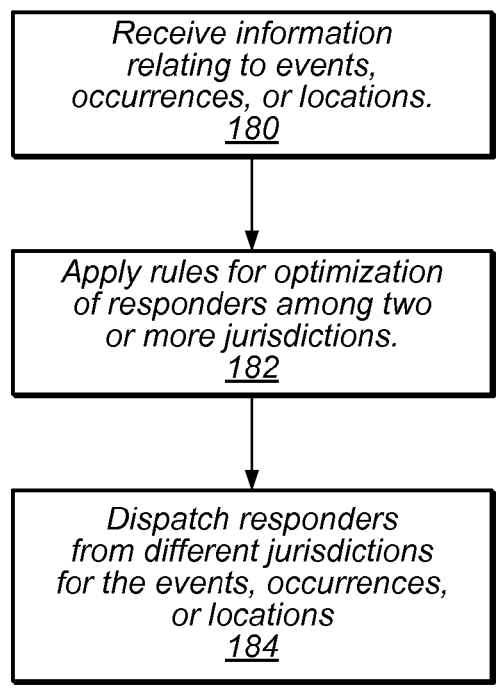
FIG. 4 illustrates one embodiment of a method of managing resources of responder agencies in multiple jurisdictions with optimization of resources.

FIG. 4 illustrates one embodiment of a method of managing resources of responder agencies in multiple jurisdictions with optimization of resources. At 180, a system receives information relating to one or more events, occurrences, or locations.

At 182, the system applies rules to determine allocation of the resources of the responder agencies. In some embodiments, a rules engine stores and accesses a different set of rules for each jurisdiction. The rules may be used for optimization of responder agency resources for the responder agencies in the relevant jurisdictions.

At 184, responders from two or more jurisdictions are dispatched to the events, occurrences, or locations. Responders from multiple jurisdictions may be dispatched to a particular event. Responders may be dispatched through web-enabled user devices over the internet. For example, in the event of a fire, fire-fighting personnel and emergency personnel from the county where the fire is and one or more adjacent counties may be dispatched to handle the fire.

Figure 5:
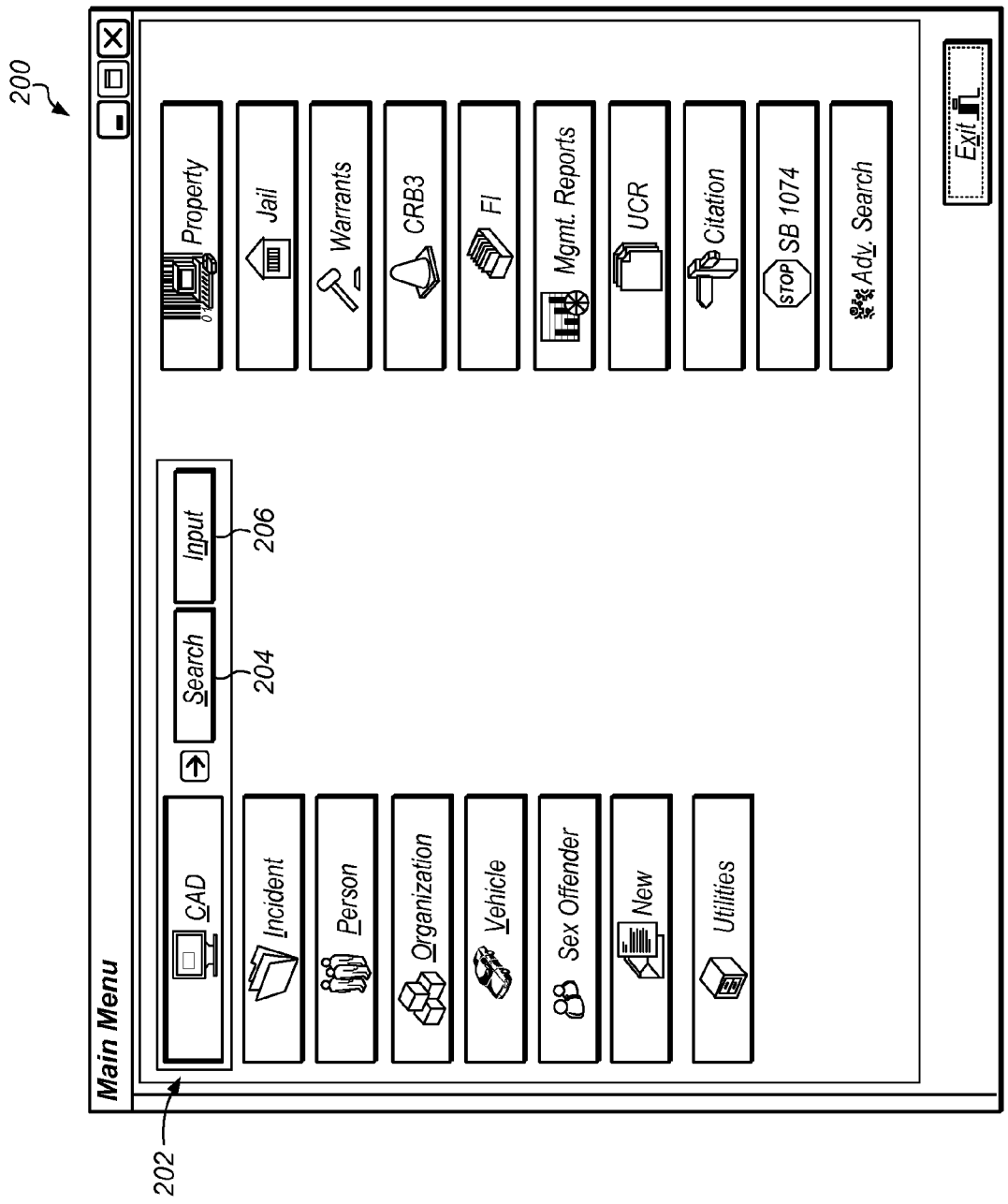
FIG. 5 illustrates one embodiment of a main menu for an information management system for an agency.

FIG. 5 illustrates one embodiment of a main menu for an information management system for an agency. Main menu 200 includes module selection buttons 202, search button 204, and input button 206. Each of menu selection buttons 202 may take the user to a primary display screen for a different module. In some embodiments, a system includes one or more of the following modules:

Call Management Module.

A Call Management Module provides call logging, with search and analysis. Calls may be "hand logged" into the module. Each call may be time stamped. Analysis reports may be used for Call for Service analysis (quantity of calls by call type, response times, time spent, record of officers assigned). Entered call data may transfer to the incident module (for example, if a report needs to be generated). For some users, the call management module may be used in lieu of a full Computer Assisted Dispatch Module (for example, without real-time updating, TLETS connectivity, or e911 pick-up).

Master Name File Module.

A master name file module provides a single file containing all persons and organizations entered into the system, which links all data entry modules. This enables a search of the entire database for any name or partial name recorded, regardless of their role in an incident.

Incident Reporting Module.

An incident reporting module provides a means to enter initial or supplemental incident reports along with data already entered through the CAD system, NIBRS formatted. The system may also launches a word processing application (for example, Microsoft Word) to provide word processing capabilities for the narrative portion of the incident report. In some embodiments, the module accepts digital photos.

Additional Modules:

Local Warrants—Maintains local records on arrest warrant and enables officers to quickly check subjects contacted in the field for local warrants.

Field Interview—Provides for recording information on subjects encountered in the field that are not arrested or cited for any violation.

Booking/Jail Management—Provides a tool for managing county jail and city lockup facilities. Links may be provided to the Master Name Module. The system provides for booking obooking of prisoners and maintaining a record of each prisoner's property, location, activity, and status. The system may include digital photo storage and photo line-up.

Property Room Management—Maintains a record of all property submitted to the agency property room for storage and/or final disposition and is specifically designed to enhance the maintenance of chain-of-custody information for evidence. It is also bar code capable.

Traffic Citations—Records all information regarding the violation being cited, the location of the offense, vehicle description, and the violator information. The system may include, or exchange information with, an automated citation programs, such as AutoCite™ system.

Traffic Accident—Provides for the preparation and printout of accident reports.

Formatted Retrieval Screens—Retrieval screens may provide for searching for calls for service and incidents by event characteristic.

GIS Interface—The system may include, or exchange information with, a geographic information system ("GIS"), such as ArcView™ GIS solution.

Citizen Self-Reporting—A web-based system for citizen reporting of thefts and other minor incidents. Incident data is held in temporary data file, merged into database after review.

Investigations Case Management—Provides the means to insure that each reported criminal case is tracked. Uses solvability factors to aid in assigning priority status and identifies case investigators along with tracking case progress.

UCR Reports—Generates the required UCR reports which must be submitted monthly to DPS.

Racial Profiling (SB-1074)—At user's option, automatic compilation of required 1074 Reports from either independent entry or combination of Field Interview and Citation Modules.

Alarm Permits and Billing—Provides a separate database for recording alarm permit information and interfaces with a database to identify excessive alarms and permit violations for the automated generation of violation invoices.

Management Reports—Generates a set of reports to aid supervisors and administration in operational and management decision making Retrieves UCR index crime information and call-for-service data from the database and generates graphical displays representing activity trends. Activity trends may be presented in Security System—Security for the edit/delete functions, limiting access for all transactions. A timer limits edit to a user defined period, e.g., 24 hours, before password security is required. Dual back-up: (1) Monthly to agency site, (2) continuous at SHSU.

Expunge—Removes the name of an individual from criminal records in accordance with the standard expungement court order.

Additional Description of Modules

Computer-Assisted Dispatch

In an embodiment, a Computer-Assisted Dispatch (CAD) system provides dispatching of police, fire, EMS, or other units (public works, for example). In addition to the logging of call history information, the unit tracking capability provides agencies with information about on-going activities. CAD administrators may define fields, such as call types and call dispositions, to customize the CAD system to their agency's needs. Multiple dispatchers can use CAD to log calls and dispatch units at the same time.

The CAD system can be operated as a single-monitor or multiple monitor application. As a dual-monitor setup, one monitor displays the active unit/pending call screen, while the other shows the CAD data entry screen. AVL and call location is displayed on a separate GIS map. When CAD is run on a single monitor it uses a split-screen view of both panels.

The CAD screen may use pop-up dialog boxes and lookup tables, providing a powerful tool for handling time-critical, emergency data in a user-friendly environment. A dispatch center is a common starting point for police activities. The CAD system may be the terminus for delivering responses to E-911 calls, traffic stops, and other phone and agency initiated activities.

Multiple agencies can be dispatched with CAD. The CAD is currently employed for combined regional dispatch centers including police, fire and EMS. In addition, the dispatcher can utilize the system to dispatch public works or transit operations for the city.

For large agencies or agencies that have a dispatch center that is in a different location from the police department, a separate CAD server can be set up to perform a replication update of the CAD system at the agency headquarters. CAD maintains separate case numbers for each situation. That is, there is a call number for dispatching information and separate case numbers are generated for each police, fire and EMS agency. For multi-agency calls (i.e., fire and police) each agency is allowed to trace its cases independent of other agencies. Telephone E-911 systems are connected the CAD to provide automatic phone and address information to the dispatchers.

Addresses can be Geo-Coded to provide cross streets and fire boxes. Key map locations can be entered and used for dispatching helicopters. Alternately, cross streets can be converted to 100 block locations. Landmark addresses such as businesses can be pre-coded for automatic address fill-in. Pre-coded landmarks also automatically populate district/beat, reporting area and sector for police, fire and EMS.

A location can have a hazard/caution flag associated for both police and fire response. The dispatched unit is alerted to bad dogs, combative occupants or other informative precautions. Thresholds can be defined to monitor units out on a call-for-service. If a unit has not responded within the defined time frame, an audio alarm will sound.

In some embodiments, a CAD-Mobile Interface provides an automatic link between the CAD and a mobile system for agencies to communicate with wireless mobile information systems. Wireless systems devices may provide one or more the following capabilities: Viewing of mobile unit status; Automated dispatch of mobile units Mobile-initiated status changes. Voiceless messaging between dispatch and units or among/between units; Status of any mobile unit is available to all units; Hot message and alarm capability; Hazard and call history are available to mobile units via voiceless system; and Voiceless request for additional call information.

Incident Management

The Incident record maintains the descriptive information of a committed offense. The Incident input screen has Incident, Offense, Relationship, Weapon, Arrestee, Offense Locations, Property, Vehicle, Involved Persons, and Investigations tabs for data input. These tabs include information such as case numbers, date and time of incident, responding officer, juvenile status, offenders, victims, state and local statutes violated, UCR offense codes, victim offender relationships, weapons involved, assault circumstances, locations for call and offenses, property involved, vehicles involved, other persons involved, and the management of any investigation.

The single Incident record contains all of the structured data, narratives and supplemental narratives relevant to a given criminal event. Additionally, information about managing the criminal incidents and the flow of paperwork associated with any investigation is recorded. The information system keeps data in a compatible format for reporting to the Uniform Criminal Reporting (UCR) system, National Incident Based Reporting System (NIBRS) and for local authorities. Narrative portions of Incident reports are generated by an integrated word processing editor. Print commands in the Incident module provide choice for printing only the structured data fields, or both the structured fields and the associated narratives.

The Incident report may include the number of offenses involved (multiple offenses may be recorded on the same Incident report), the number of involved persons, and the amount of property associated with the incident. The Incident report may provide a summary of all known facts regarding the incident. The packet of reports that can make up a case report include a summary report, an original narrative, all supplemental narratives, a detailed involved persons report, a detailed arrest report, a property report, and a vehicle report.

Searches based upon a combination of fields within the Incident record can be performed. The Public Report button provides a report with delimited information that can be disseminated to the public for any Incident found via the search engine. The Results button provides the capability of producing summary reports based upon any grouping of Incidents returned via the search engine. For example, a report could be produced for all armed robbery cases between June 1 and June 30 that were assigned to Officer Jones.

Master Name File

The Master Name File (MNF) module is the repository of data that describes persons. Persons identified in any of the other modules or components of the system, such as Incident, Booking, and Field Interview, are described within MNF, but referenced back to these modules or components. These data are accessed via the tabs of View All, Name/Roles, Characteristics, Vitals, Address/Phone, ID/Fingerprint, Employment/Military, School/Medical, Remarks, and Photos. Within these tabbed screens are input screens that allow for multiple entries. The MNF allows for multiple names, addresses, phone numbers and characteristic descriptors. A record may contain names, aliases, name descriptors that allow for multiple names, nicknames and titles that describe the person. Additional tabs present descriptive information about the person such as age, weight, height, sex, scars, tattoos, build, eye color, facial hair, master hand, ethnicity, place of birth, resident status, marital status, religion, etc. Another tab captures address and phone data, and can handle addresses and phone numbers as they change over time. Another tab may be provided for ID's and scanned fingerprint linkages.

Identifiers can be such things as driver's license, social security numbers and agency arrest ID's. If an agency chooses to log very detailed information, the MNF allows input about employment, occupations, military service, education, medical conditions, and remarks for other important information that is not available in the structured fields. Multiple digital photos may be assigned to the person; as well as other multimedia items such as audio, video and scanned images. Since criminals try to make their identity difficult for authorities, the input screens described above may allow multiple values to be entered for what are normally single entry characteristics. For example, multiple dates of birth can be attached to a person. When a person already in the Master Name File is encountered again, the system automatically fills in the descriptive characteristics previously entered. These can be overwritten (updated), but the original data is preserved in the system.

The system displays what role the person has had in various incidents. By selecting a role in the grid and pressing the View Incident button, the Incident record associated with the person will be displayed. One of the advanced features incorporated in the MNF is the ability to link the input of new names to existing names. For example, if a user inputs the name Joe Smith and several Joe Smiths are already in the MNF, the user will be prompted to select an existing Joe Smith or continue inputting the name as a new name. This important feature keeps duplicate input of names to a minimum. When duplicate names occur, the system may perform a sweep of the MNF to condense and merge duplicates.

The Master Name File Organization record may be used to record extensive descriptive information about operational organizations. Organizations identified in any of the other associated modules of the system, such as Incident, Booking, and Property Room, are described and stored within MNF Organization and referenced by these other modules. These data may be accessed via the tabs including View All, Name/Roles, Address/Phone, Remarks, and Photos. Within these tabbed screens are input screens that allow for multiple entries for describing the organization's address, phone numbers and contact people. A group box may display a list of all roles that the organization has had in Incidents recorded in the system. By selecting a role and pressing the View Incident button, the user can open up the Incident record associated with the selected incident. This gives the user a quick history of the involvement of an organization with the police agency.

Geographic Information Interface

In some embodiments, a relational database provides the ability to present data in many different forms. Criminal incidents for any time period can be overlaid on a map of a jurisdiction. Likewise, specific crimes such as drug possessions can be mapped. Real time interfaces displaying both call and patrol/fire vehicle locations can be created with customized programming as demonstrated with the screen below. Transmission of AVL location may be built into a mobile system. Location update may vary with vehicle speed. Unit status may be displayed. A GIS may be used to pinpoint a crime location. By selecting a point on the map, information about the incident is displayed on the screen. In some embodiments, the system extracts data from other city databases, such as property, to present plat descriptions of points of interest.

Reports

In various embodiments, a system generates reports for one or more users. The reports may reflect computer activity that can be used for analytical purposes. The results may include information in tabular form, graphical form, or a combination thereof. The user may specify the information to be provided in a report. The following is a list of reports that may be generated in some embodiments.

Figure 6:
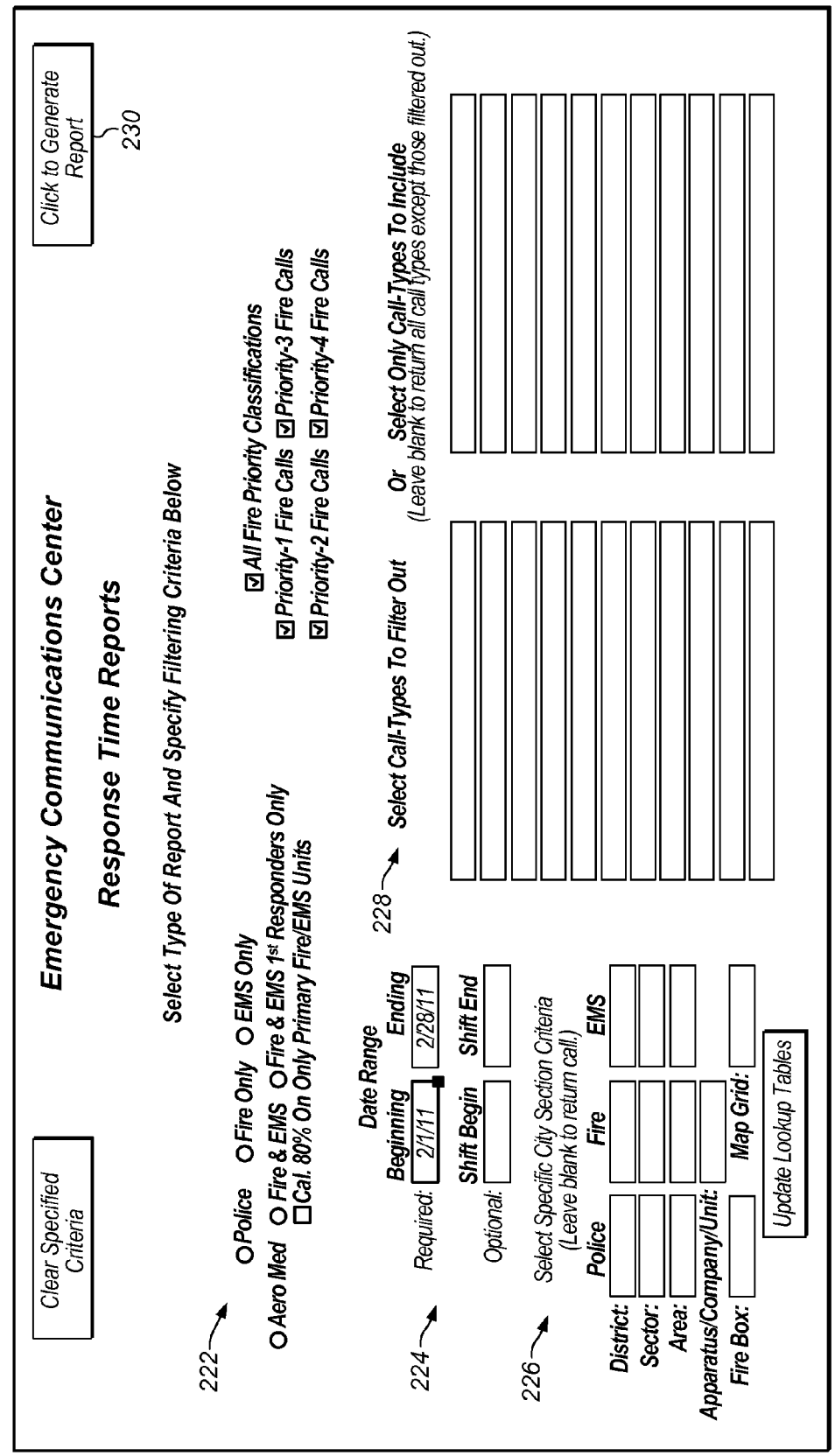
FIG. 6 illustrates one embodiment of a screen for specifying criteria for response time reports.

A Response Time Breakdown report allows for the selection of specific criteria to identify the types and locations of Call-For-Service to be included on the report. The report may provide a breakdown of all the activities associated with the response to each CFS as well as averages for each priority type. This data may also be displayed in Graph form. FIG. 6 illustrates one embodiment of a screen for specifying criteria for response time reports. Report 220 includes report type menu 222, date range input fields 224, jurisdiction fields 226, and call type filter panel 228.

Figure 7:
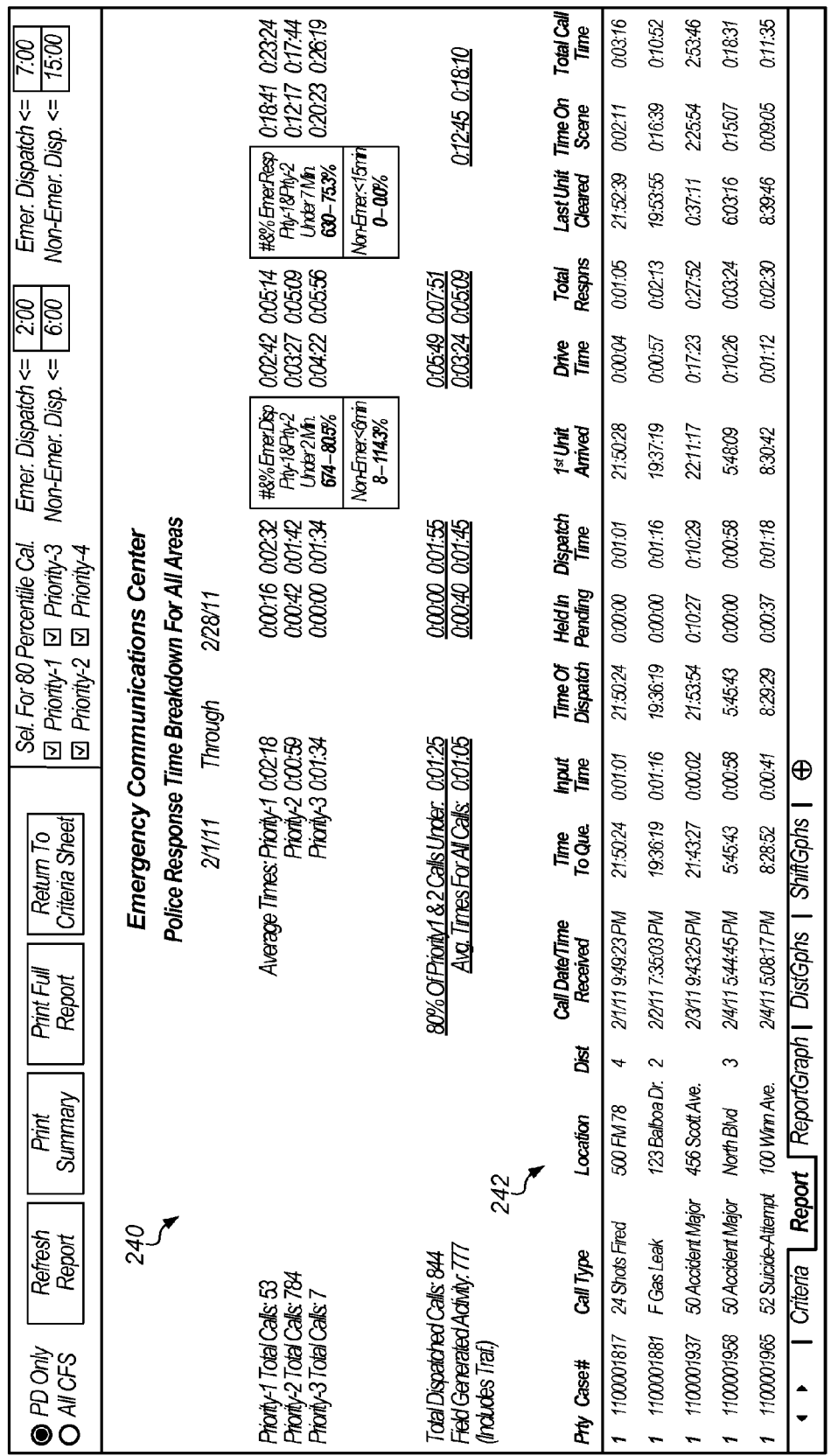
FIG. 7 illustrates one embodiment of a response time breakdown for a police agency.

FIG. 7 illustrates one embodiment of a response time breakdown for a police agency. Summary panel 240 may provide performance and statistical information for the agency based on specified criteria. Case listing 242 provides information on a call by call basis.

A Dispatcher's Response Log report focuses on the time spent by Call-Takers to input the call information into the system along with the time taken before the call is dispatched to the responding units. FIG. 8 illustrates one embodiment of a dispatcher response log report. Criteria selection panel 250 allows the user to select criteria (for example, filters) to identify the types of calls to include on the report as well as how the information will be displayed. Individual Call-Taker's or Dispatcher's average times are calculates as are combined totals for the specified date/time range and displayed in results panel 252.

Figure 9:
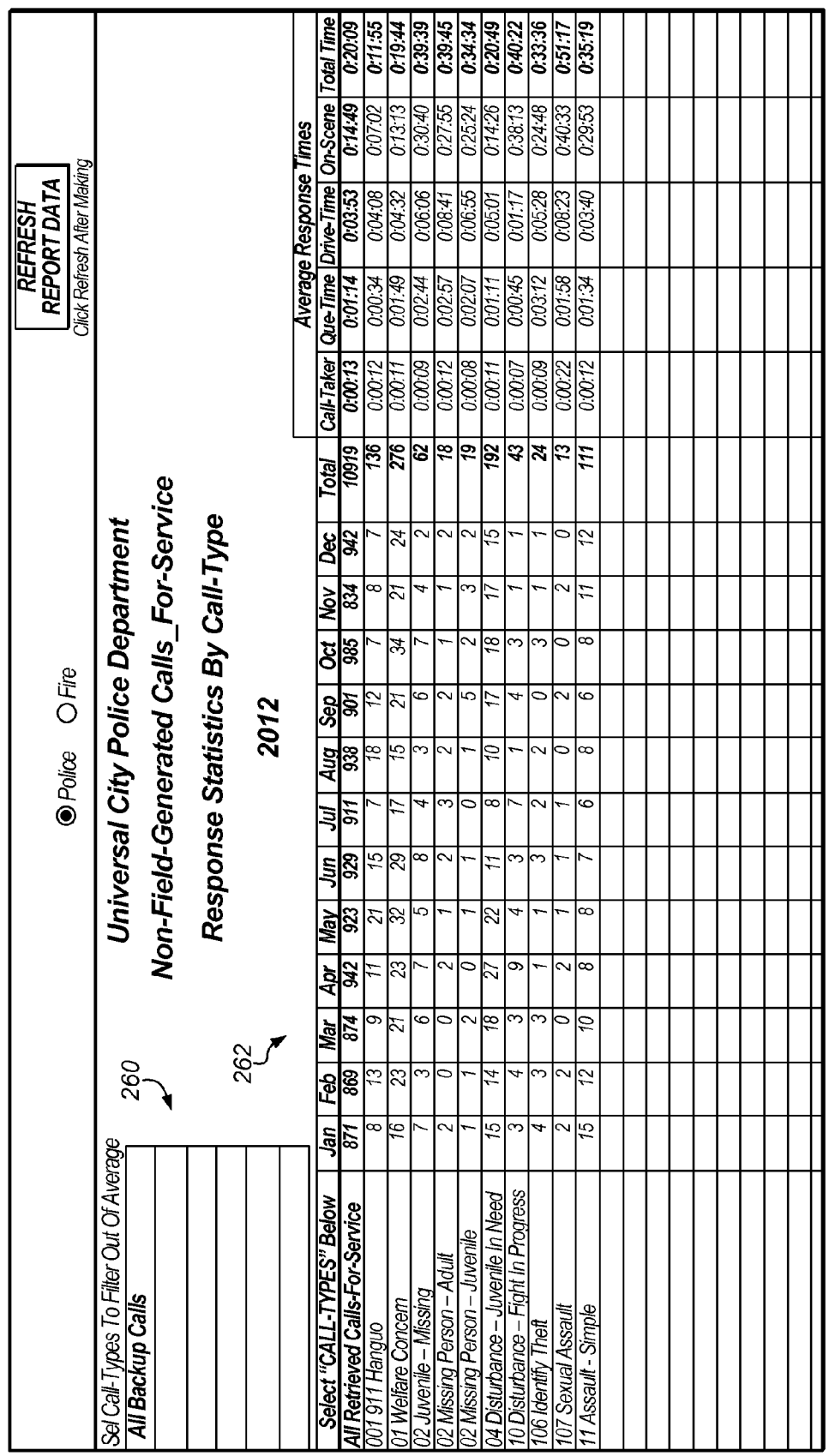
FIG. 9 illustrates one embodiment of a response statistics by call type report.

A Response Statistics by Call-Type report provides calls for service stats for selected Call-Types. FIG. 9 illustrates one embodiment of a response statistics by call type report. Criteria selection panel 260 allows the user to select call-types to be selected and other criteria. In some embodiments, a user may select call-types to be filtered out of the computed average. A listing the number of occurrences during each month of the year along with a breakdown of the average response times associated with each type of call may be displayed in results panel 262.

Figure 10:
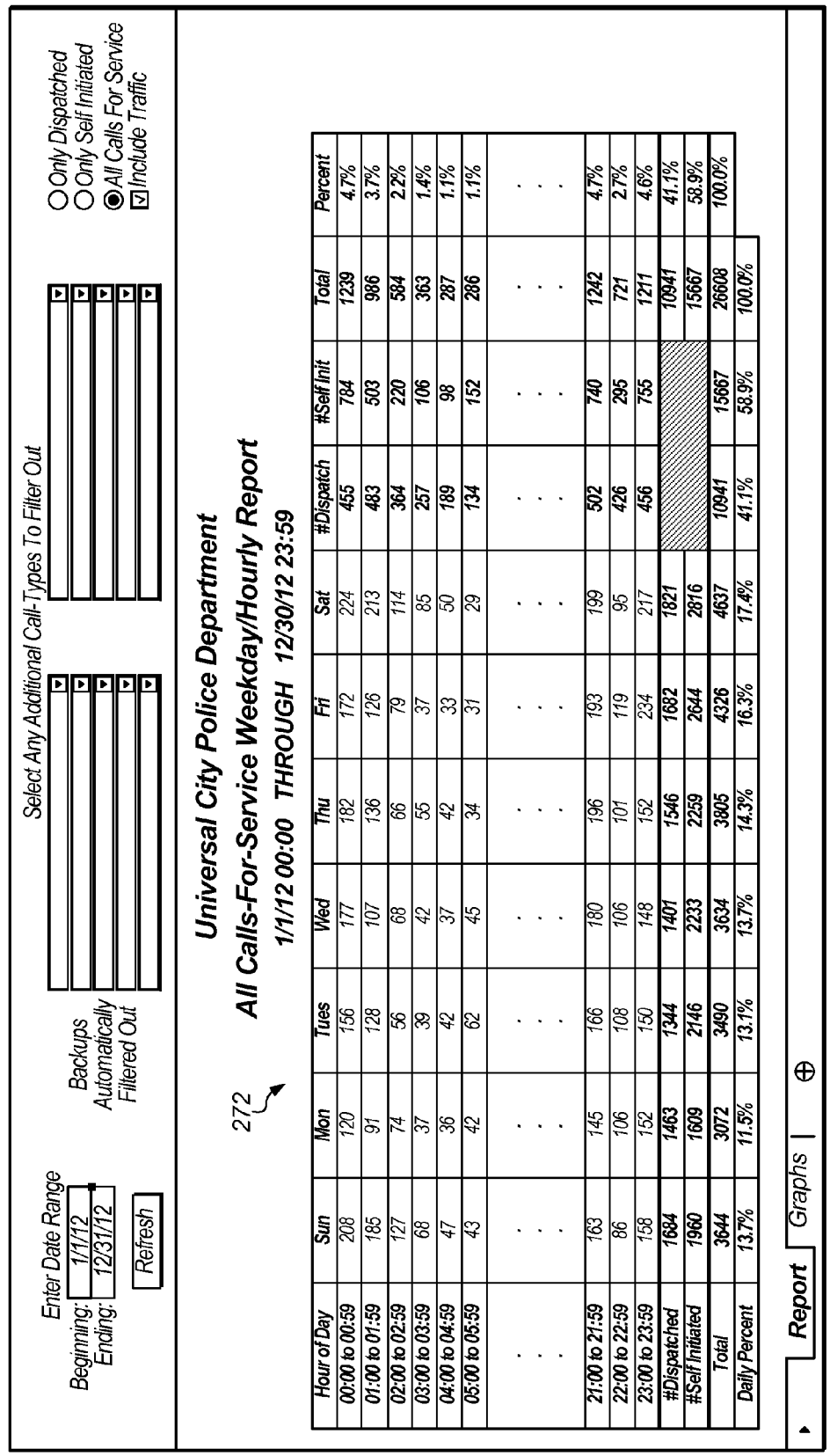
FIG. 10 illustrates one embodiment of a response statistics by call type report.
Figure 11:
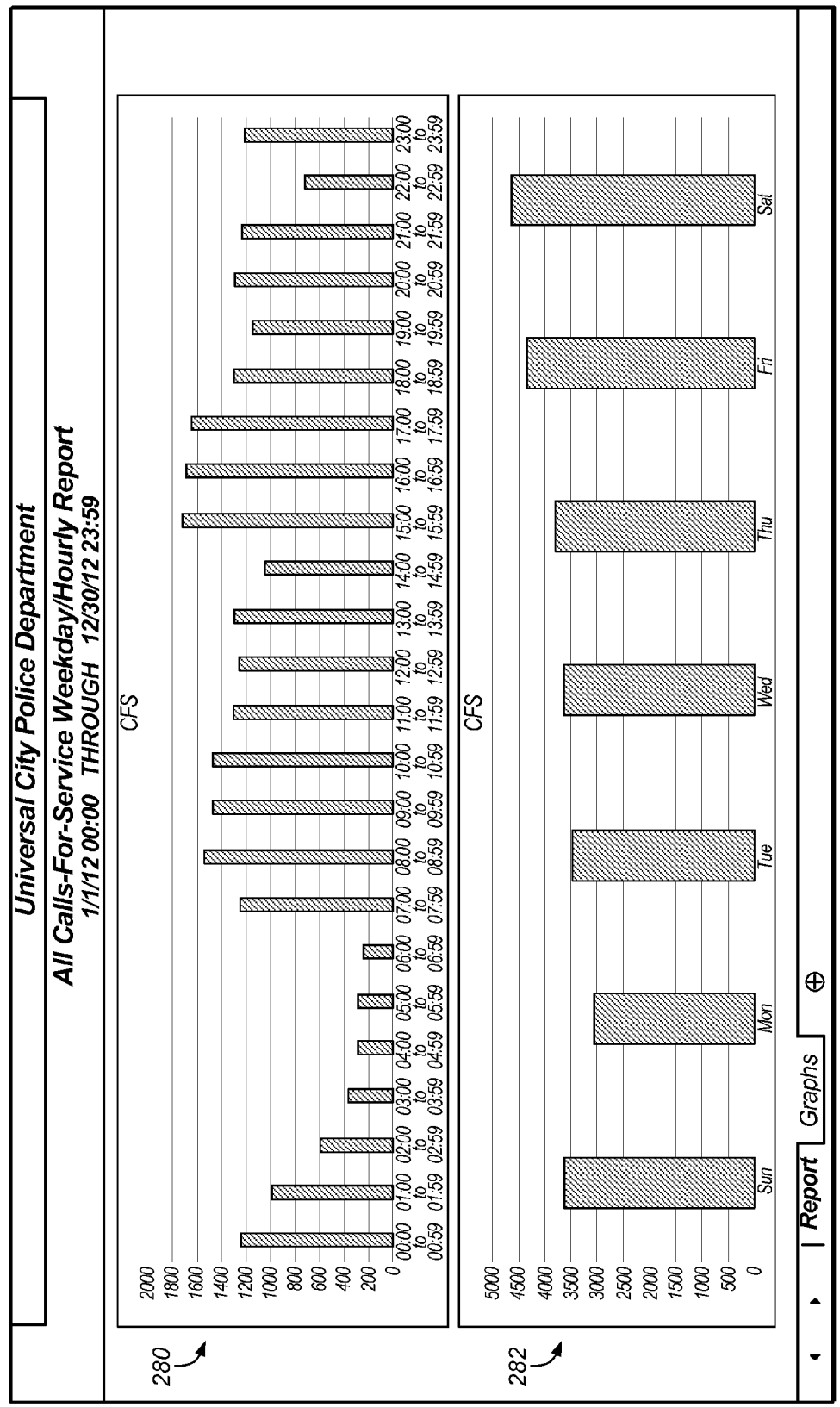
FIG. 11 illustrates one embodiment of results of calls-for-service weekly/hourly report with a graphic display of results.

A Call-For-Service Weekday/Hourly report generates both a chart and graphs reflecting by weekday and hour of day that calls are being received. FIG. 10 illustrates one embodiment of a response statistics by call type report. Criteria selection panel 270 is provided at the top to allow the user to identify the types of calls for service to include on the report. Results are displayed in results panel 272. FIG. 11 illustrates one embodiment of results of calls-for-service weekly/hourly report with a graphic display of results, including hourly bar chart 280 and weekly bar chart 282.

FIG. 12 illustrates one embodiment of a calls-for-service by type report. Calls-For-Service by Type report includes criteria selection panel 290 and report panel 292. Report panel 292 provides a complete listing of all call types entered into CAD within the specified date range and provides a listing of the number of primary and backup units that had responded to each type of call. Criteria selection panel 290 allows the user to filter out any call types that the user wishes to have excluded from the report.

FIG. 13 illustrates one embodiment of a call source report. Call Source Report includes a listing by source 300. The number and percent of calls being received for each of the various sources is provided.

Other reports, such as the New/Forced-Entry Street Names, may be generated to insure correct data entry into CAD. The New/Forced-Entry Street Names report provides a list of street names that have been entered into CAD that do not match the street listing in the lookup tables. A similar report, "Landmark & Cross-Street Errors", identifies street names incorrectly entered into those tables.

Other reports may be used for monitoring CAD activities. For example, a Mobile Activity Report reflects activities entered through the Mobile system. A Mobile Messages report lists messages sent through the system. Both of these reports allow the user to select specific date ranges as well criteria that may be used to retrieve only the desired data. The Officer's Logged Time & Mileage report may be used to calculate the amount of time an officer is logged into CAD as well as calculating the mileage that is being driven (though accurate reporting presumes that the officers are diligent in entering such information when logging in and out of the mobile system.)

In some embodiments, based on user-defined criteria (such as date-ranges), a system generates reports that reflect computer-aided dispatch activity that may be used for analytical purposes. Results may be displayed in graphical form.

Figure 14:
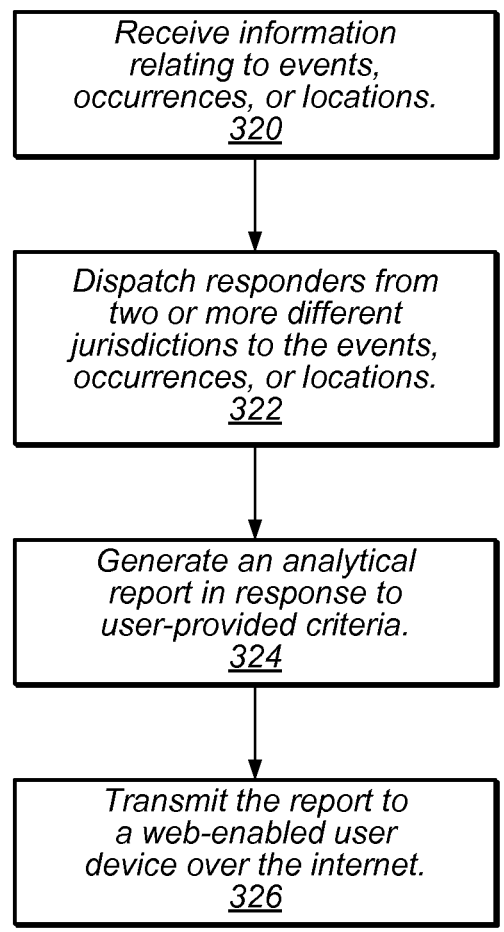
FIG. 14 illustrates one embodiment of reporting on public responder agency activities.

FIG. 14 illustrates one embodiment of reporting on public responder agency activities. At 320, information relating to one or more events, occurrences, or locations is received in a system. At 322, responders from two or more different jurisdictions to the events, occurrences, or locations are dispatched.

Users may provide criteria for generating a report. The users providing the criteria may be a dispatcher, a responder, an administrator, or other person. At 324, analytical reports are generated in response to the user-provided criteria. Information may be displayed in tabular, graphical, or other formats.

At 326, the reports are transmitted to a web-enabled user device over the internet. In some embodiments, reports are displayed on a call management module. In various embodiments, the reports may include the information described above relative to FIGS. 6 through 13.

Performance Graphs

In some embodiments, reports may include performance graphs. In some embodiments, a system generates one or more of the performance graphs described below.

Figure 15:
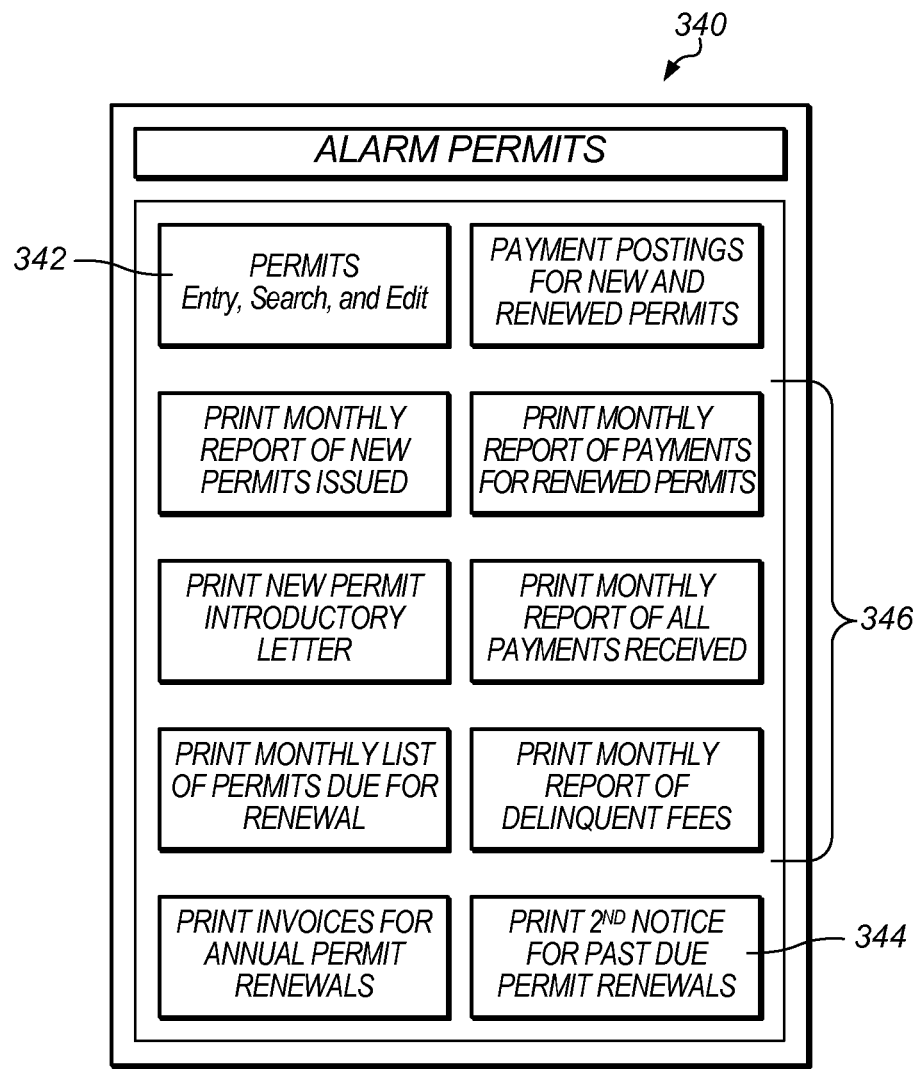
FIG. 15 illustrates one embodiment of a menu for managing alarm permits.

UCR 5-year Trend Comparison Graphs (Including Charts Indicating Annual Percent of Change)
  Violent Crimes per 1,000 pop. (Murder, Rape, Robbery, Agg. Assault)
  Property Crime per 1,000 pop. (Burglary, Theft, Auto Theft)
  All Index Crimes per 1,000 pop. (Combined Total of All UCR Reported Crimes)
  Index Crime Rate Comparison of agency with six other Texas cities of comparable sizes (Three Larger/Three Smaller)
Biennial UCR trend comparison (Comparing the last 12 months to the previous year)
  Part I Offenses by Category and Individually per 1,000 pop.
  Percent of Part I Offenses Cleared by Category and Individually
  Stolen Vehicles Recovered
  Reported Residential/Business Burglaries
  Reported Thefts from Motor Vehicles
  Local/National Crime Clearance Rates for each Index Crime
  Violent/Property Crime Clearance Rates (Local v National)
Biennial Call-for-Service and Activity Comparison Graphs
  911 Calls-for-Service by Call Type
  Average Response Time for Priority-1, 2, and 3 Calls-for-Service
  Average Response Time for Specified Percent of Priority 1 Calls Received
  Total Traffic Citations Issued
  Moving/Non-Moving Traffic Violations Cited
  Other Misdemeanors Cited
  Parking Tickets Issued
  Warning Citations Issued
  Major Traffic Accidents/Injuries/Fatalities
  Accidents Involving DWI
  Arrests for Felony/Misdemeanor/DWI/DUID/Municipal Charges
  Total Arrests/Adult, Juvenile/Drug-Related
  Police Confrontations (Use of Force Incidents and Officers Assaulted)
  Police Involved Traffic Accidents
  Vehicle Pursuits
  Internal Affairs Investigations
  IAD Complaints Received/Sustained
  Personnel Leave Categories
Alarm Permits For agencies that issue alarm permits, a database may be provided to record all pertinent information regarding the location, alarm company, and contact information. FIG. 15 illustrates one embodiment of a menu for managing alarm permits. Menu 340 allows for entry, search and editing of alarm information via alarm information entry button 342. Notices regarding permit violations may be generated at the user request by way of notice buttons 344. Reports relating to alarm violations may be generated at user request by way of report buttons 346. In some embodiments, a notice is generated in response to permit violations exceed a predetermined threshold. The threshold may be user-defined at an agency level.

FIG. 16 illustrates one embodiment of a search screen for alarm permits. Search screen 360 includes information fields 362. Alarm information may be entered, viewed, and edited in alarm information fields 362. Payments for permits and/or fines may be managed in payment box 364. The permit database may be searched by way of search bar 366.

Figure 17:
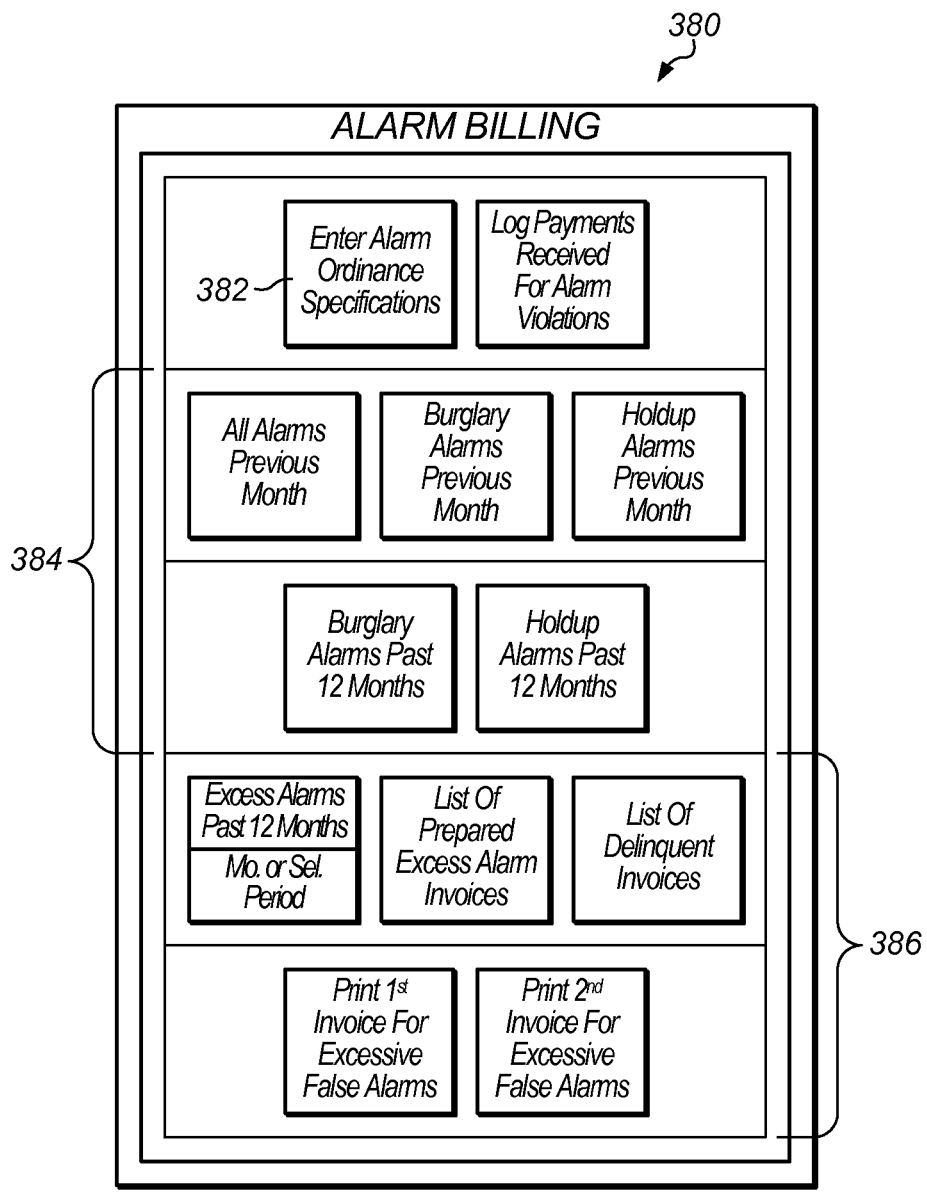
FIG. 17 illustrates an embodiment of a menu for alarm billing.

If the permit requires a fee, the fees may be recorded and receipts printed. If the permit requires a renewal, a list of permits due for renewal may be generated, along with renewal notices and delinquent notices. FIG. 17 illustrates an embodiment of a menu for alarm billing. Alarm billing menu 380 includes ordinance specification button 382, alarms inquiry buttons 382, excess alarm inquiry panel 384, and invoice panels 386. Ordinance specifications button 382 may activate an input screen for entering jurisdiction-specific information for alarm permit violations, excess alarm violations, or other alarm-related criteria.

In some embodiments, an alarm billing system retrieves false alarm information. Based on user-defined alarm ordinance parameters, the system identifies those locations that have exceeded the allowable number of false alarms and generate notices assessing established fees for the excessive number of false alarms. The system may also allow for the recording of fees received and can generate a second notice for delinquent fees.

In some embodiments, the system checks the location of false alarms and identifies those locations that have not been issued Alarm Permits. Notices may be generated to advise the occupants of the requirement to obtain the Alarm Permit. Different criteria may be provided for each agency's specific requirements.

In certain embodiments, by selecting a month or a selected time period, a report is generated to identify all locations exceeding the allowable number of false alarms during that period along with printing the appropriate invoice and documenting when those invoices were printed.

In some embodiments, a system manages information relating to alarms systems, including location, alarm company, contact information, fees, and renewals. The system may retrieve false alarm information. Based on the particular alarm ordinance parameters of the jurisdiction, identifies those locations that have exceeded the allowable number of false alarms and generate notices assessing established fees for the excessive number of false alarms. The system may also allow for the recording of fees received and generate notices for delinquent fees. In some cases, the system checks the location of false alarms and identifies those locations that have not been issued Alarm Permits, and notifies occupants accordingly. Notices may be customized to meet each particular agency's specific requirements. In some cases, a report may be generated for a user-specified time period to identify all locations exceeding the allowable number of false alarms during that period.

Figure 18:
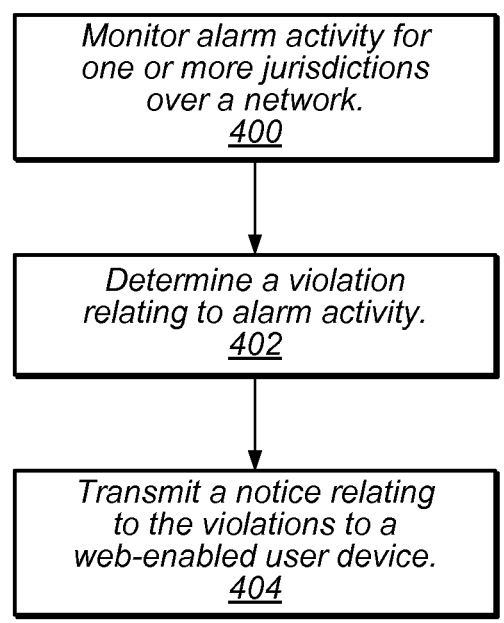
FIG. 18 illustrates one embodiment of managing alarm system activity over a network.

FIG. 18 illustrates one embodiment of managing alarm system activity over a network. At 400, alarm activity is monitored for one or more jurisdictions over a network. Alarm systems may be monitored at commercial locations, residential locations, or combinations thereof. Monitoring may be based on criteria specific to each jurisdiction (for example, municipality) in which the alarm systems are located.

At 402, one or more violations relating to the alarm systems are detected. In some embodiments, a violation relates to the lack of a permit. In other embodiments, the alarm relates to excess violations.

At 404, a notices relating to the violations are transmitted to a web-enabled user device over a network the internet. The notices may be transmitted to one or more owners of the properties where the violations occurred, private security agencies, or law enforcement agencies.

In some embodiments, information for providing public services, such as police, fire, and emergency, by way of a cloud computing system over a communications network. FIG. 19 illustrates one embodiment of a cloud computing system that can be implemented to provide information to participants in responder agencies. System 1100 includes computer aided dispatch systems 1102 and call management modules 1104. Computer aided dispatch systems 1102 and call management modules 1104 may each be associated with one or more responder agencies. Computer aided dispatch systems 1102 and call management modules 1104 may be located one or more responder locations, such as police stations. In some embodiments, call management modules 1104 are located remote from a the responder agency's facility. Computer aided dispatch systems 1102 and call management modules 1104 may include a network of computing devices connected to network 1106. Each of computer aided dispatch systems 1102 and call management modules 1104 may be connected to cloud computing system 1108 by way of network 1106. In certain embodiments, Computer aided dispatch systems 1102 and call management modules 1104 are connected to one another by way of network 1106.

Cloud computing system 1108 may provide remote computing resources, remote storage resources, or both, for systems connected to cloud computing systems 1108. For example, cloud computing system 1108 may provide cloud computing services to users of computer aided dispatch systems 1102. Cloud computing system 1108 may allow dispatchers, responders, managers, or other personnel to access incident and event information and related information by way of call management modules 1104. Call management modules 1104 may be, for example, workstations or mobile devices in the field.

Various system architectures may be employed in cloud computing system 1108. Systems and components of cloud computing system 1108 may be at a single physical location, such as a medical facility or data center, or distributed among any number of locations. Cloud computing system 1108 includes cloud application services 1110, cloud platform 1112, cloud infrastructure 1114, cloud data storage 1116, and cloud security 1118. Cloud applications services may be implemented by way of one or more computer systems, each include one or more central processing units, such as described herein. Examples of application services 1110 include providing responder dispatch optimization, regional database management, secure login, and reporting to agency users. Cloud application services 1110 may access cloud data storage 1116.

Cloud infrastructure 1114 may encompass a variety of physical resources, such as computing devices, servers, block storage, mass storage devices, file servers, software, and network systems. In some embodiments, a cloud computing system encompasses virtualized resources, such as virtualized data storage or virtualized hardware.

In some embodiments, a service provider provides services to participants, including dispatchers and responders, by way of cloud computing resources. In some embodiments, computation resources are rented or leased to customers of the service provider. In certain embodiments, services are provided to users at sites as software as a service ("SaaS") or platform as a service ("Paas"). Services may be provided to each user on an on-demand basis.

A dispatch system, agency system, or call management system may include, and/or may be implemented as, multiple functional modules or components, with each module or component including one or more provider network resources (e.g., computing resources, storage resources, database resources, etc.). For example, system 1100 illustrated in FIG. 19 may include, in one embodiment, a dispatch component, an optimization component, a database management component, and a reporting component. A system may include more or fewer components or modules, and a given module or component may be subdivided into two or more sub-modules or subcomponents. Also, two or more of the modules or components as shown can be combined.

In various embodiments, some users may be connected over a different network than other users. For example, as shown in FIG. 19, some of call management modules 1104 may be connected to cloud computing system 1108 over network 1107. In some embodiments, one or more users are connected over a private network. For example, in the embodiment shown in FIG. 19, network 1106 may be a public network and network 1107 may be a private network.

In various embodiments, a user may communicate over systems in system 1100 from numerous field locations. For example, a responders may communicate with users at a remote location by way of responder devices 1121 and 1122. Responder devices 1121 and 1122 may be portable electronic devices. Responder devices 1121 and 1122 may be located anywhere, including an accident scene, crime scene, or any other location.

Although for illustrative purposes only three computer aided dispatch systems and three call management systems are shown in FIG. 19, a system may include any number of site computer systems at any number of agency facilities or other locations.

Computer systems may, in various embodiments, include components such as a CPU with an associated memory medium such as Compact Disc Read-Only Memory (CD-ROM). The memory medium may store program instructions for computer programs. The program instructions may be executable by the CPU. Computer systems may further include a display device such as monitor, an alphanumeric input device such as keyboard, and a directional input device such as mouse. Computer systems may be operable to execute the computer programs to implement computer-implemented systems and methods. A computer system may allow access to users by way of any browser or operating system.

Computer systems may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method of managing responder agency resources, comprising:

receiving, by a dispatch system implemented on one or more computer systems, information relating to one or more events, occurrences, or locations; and receiving, by the dispatch system, one or more search queries;

searching responder systems from two or more different jurisdictions;

providing a search result based on a search of the responder systems;

dispatching, by the dispatch system, responders from at least two of the jurisdictions to at least one of the events, occurrences, or locations, wherein dispatching comprises applying, by the dispatch system, one or more rules for allocating resources, and wherein at least one of the rules for allocating resources comprises a rule for optimization of responders among at least two of the jurisdictions;

wherein at least one of the responders is dispatched through an agency system of a responder agency of a first jurisdiction, wherein at least one other of the responders is dispatched through an agency system of a responder agency of a second jurisdiction, wherein at least one of the responders is dispatched through a web-enabled dispatch device over the internet.

2. The method of claim 1, wherein at least one of the web-enabled dispatch devices comprises a call management module, the method further comprising logging one or more calls with the call management module.

3. The method of claim 1, wherein at least one of the events, occurrences, or locations is a possible crime incident, wherein at least one the responders is a police officer.

4. The method of claim 1, wherein at least one of the events, occurrences, or locations is a fire, wherein at least one the responders is a firefighter.

5. The method of claim 1, wherein at least one of the events, occurrences, or locations is an accident, wherein the responders comprise emergency medical personnel.

6. The method of claim 1, wherein at least one of the events, occurrences, or locations is a 911 emergency.

7. The method of claim 1, wherein at least one of the events, occurrences, or locations is a natural disaster.

8. The method of claim 1, wherein at least one of the dispatches is made from a web-based dispatcher device to one or more of the responders over the internet.

9. A system, comprising:
a dispatch system implemented on one or more computer systems, wherein the dispatch system comprises one or more web-enabled dispatch devices, wherein the dispatch system is configured to implement:
receiving, by the dispatch system, one or more search queries;
searching responder systems from two or more different jurisdictions;
providing a search result based on a search of the responder systems;
receiving information relating to one or more events, occurrences, or locations; and
dispatching responders from at least two of the jurisdictions to at least one of the events, occurrences, or locations, wherein the responders provide a similar service, wherein dispatching comprises applying, by the dispatch system, one or more rules for allocating resources, and wherein at least one of the rules for allocating resources comprises a rule for optimization of responders among at least two of the jurisdictions;
wherein at least one of the responders is dispatched through an agency system of a responder agency of a first jurisdiction, wherein at least one other of the responders is dispatched through an agency system of a responder agency of a second jurisdiction,
wherein at least one of the responders is dispatched through the web-enabled dispatch device over the internet.

10. The system of claim 9, wherein at least one of the web-enabled dispatch devices comprises a call management module configured to log one or more calls with the call management module.

11. The system of claim 9, wherein at least one of the events, occurrences, or locations is a possible crime incident, wherein at least one the responders is a police officer.

12. The system of claim 9, wherein at least one of the events, occurrences, or locations is a fire, wherein at least one the responders is a firefighter.

13. The system of claim 9, wherein at least one of the events, occurrences, or locations is an accident, wherein the responders comprise emergency medical personnel.

14. The system of claim 9, wherein at least one of the events, occurrences, or locations is a 911 emergency.

15. The system of claim 9, wherein at least one of the events, occurrences, or locations is a natural disaster.

16. The system of claim 9, wherein at least one of the dispatches is made from a web-based dispatcher device to one or more of the responders over the interne.

17. A method of managing responder agency resources, comprising:
receiving, by a dispatch system, information relating to one or more events, occurrences, or locations;
receiving, by the dispatch system, one or more search queries;
searching responder systems from two or more different jurisdictions;
applying, by the dispatch system, one or more rules for allocating resources, wherein at least one of the rules comprises a rule for optimization of responders among at least two of the jurisdictions; and
providing a search result based on a search of the responder systems; and
dispatching, by the dispatch system, based on the rules applied by the dispatch system, responders from at least two of the jurisdictions for at least one of the events, occurrences, or locations,
wherein at least one of the responders is dispatched through a system of a responder agency of a first jurisdiction, wherein at least one other of the responders is dispatched through an agency system of a responder agency of a second jurisdiction.

18. The method of claim 17, wherein at least one of the responders is dispatched through a web-enabled call management module over the internet.

19. The method of claim 17, wherein at least one of the events, occurrences, or locations is a possible crime incident, wherein at least one the responders is a police officer.

20. The method of claim 17, wherein at least one of the events, occurrences, or locations is a fire, wherein at least one the responders is a firefighter.

21. The method of claim 17, wherein at least one of the events, occurrences, or locations is an accident, wherein the responders comprise emergency medical personnel.

22. The method of claim 17, wherein at least one of the dispatches is made from a web-based dispatcher device to one or more of the responders over the web.

* * * * *

UNITED STATES PATENT AND TRADEMARK OFFICE
CERTIFICATE OF CORRECTION

PATENT NO. : 9,787,849 B2  
APPLICATION NO. : 14/631452  
DATED : October 10, 2017  
INVENTOR(S) : Larry T. Hoover Page 1 of 1

It is certified that error appears in the above-identified patent and that said Letters Patent is hereby corrected as shown below:

In the Specification

At Column 1, before the heading "PRIORITY CLAIM", please insert the following:
--STATEMENT REGARDING FEDERALLY SPONSORED RESEARCH OR DEVELOPMENT
This invention was made with government support under 2000-RD-CX-K005 awarded by the U.S. Department of Justice. The government has certain rights in the invention.--

Signed and Sealed this  
Fifteenth Day of December, 2020

Andrei Iancu  
*Director of the United States Patent and Trademark Office*